July 22, 1958   J. C. STREB ET AL   2,844,344
TIERING PALLET CONSTRUCTION
Filed Sept. 22, 1953
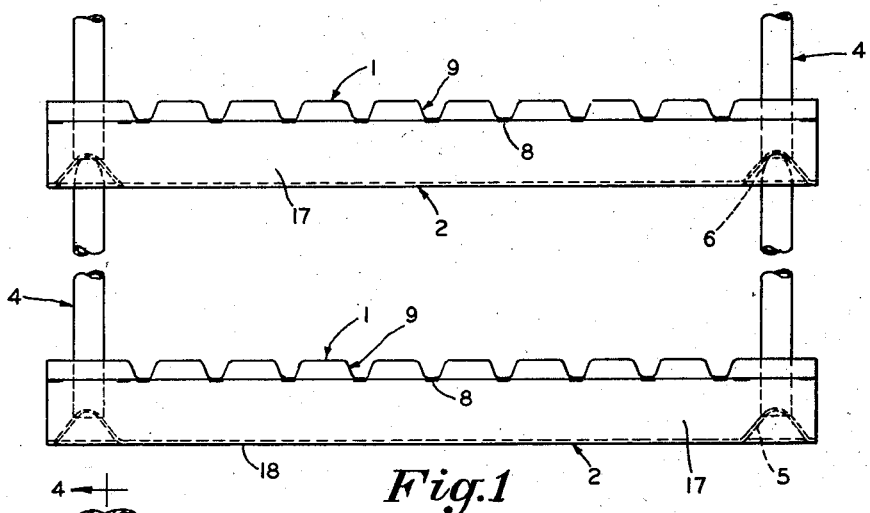
Fig.1
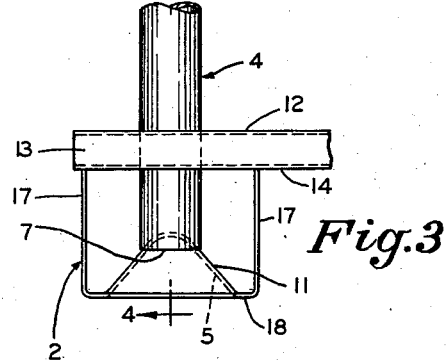
Fig.3
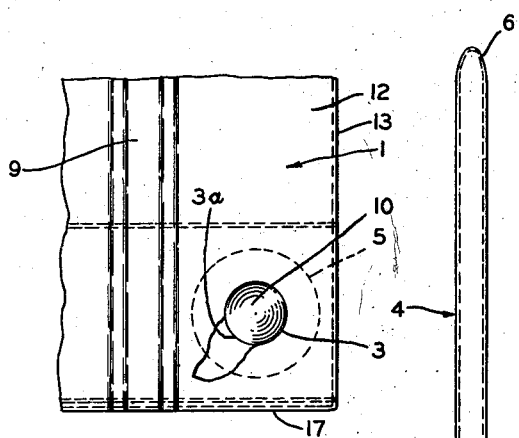
Fig.2
Fig.5
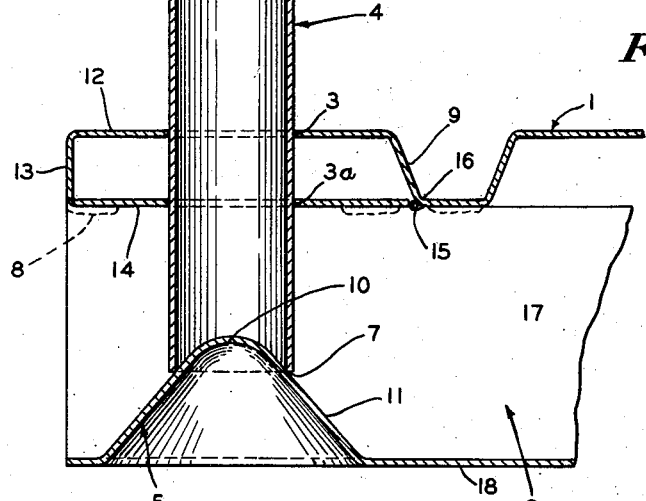
Fig.4
INVENTORS
Joseph C. Streb and
George B. Bole
BY Frease & Bishop
ATTORNEYS

United States Patent Office 2,844,344
Patented July 22, 1958

2,844,344

TIERING PALLET CONSTRUCTION

Joseph C. Streb and George B. Bole, Canton, Ohio, assignors to The Union Metal Manufacturing Company, Canton, Ohio, a corporation of Ohio Application September 22, 1953, Serial No. 381,606

1 Claim. (Cl. 248—120)

Our invention relates to improvements in material handling pallets, and more specifically to tiering pallets with separable spacing legs for use with fork lift trucks.

Some of the tiering pallet constructions now in general use are merely of a flat horizontal platform type without spacing legs to support the second pallet above the first or base pallet, nor any legs to support any subsequent pallets stacked on top of the second pallet. The tiering, with such a pallet, is accomplished by loading the first pallet with material to a uniform height over its entire loading surface area. The top of the load then forms a flat surface on which the second pallet can be tiered or stacked.

The principal disadvantage of this type construction is the necessity of loading the pallet with an absolutely uniform height load so that the next higher pallet may be received and supported in a horizontal position. Also a disadvantage, is the requirement that the load be strong and sturdy enough to support all the pallets and their respective loads stacked above it.

Another type tiering pallet now in general use has spacing legs to support the pallets subsequently stacked above it. Such present types, however, usually have complicated and expensive corner devices or sockets to receive the spacing legs with some requiring a locking device to retain the spacing legs in proper place. Many, also, use a special distinct pallet as the base pallet with a different type required for the tiering pallets above it.

It is, therefore, a general object of the present invention to provide a tiering pallet construction which eliminates the disadvantages of the prior constructions.

It is the primary object of the present invention to provide a tiering pallet that is simple in structure, thereby making it economical to manufacture.

It is a further object of the present invention to provide tiering pallets that are completely interchangeable, any one of which can be used as a base pallet on which other pallets may be tiered.

It is still another object of the present invention to provide a tiering pallet which has positive means for receiving and centering the separable spacing legs, such means being hidden and protected from damage under normal usage. This object is accomplished by the unique design of the spacing leg receiving member.

Finally, it is an object of the present invention to provide a tiering pallet that requires no additional parts to be assembled, other than the spacing legs, during the tiering operation, and does not increase the initial height of the pallet.

These and other objects are accomplished by the parts, constructions, arrangements, combinations and subcombinations comprising the present invention, the nature of which is set forth in the following general statement a preferred embodiment of which—illustrative of the best mode in which applicants have contemplated applying the principles—is set forth in the following description and illustrated in the accompanying drawings, and which is particularly and distinctly pointed out and set forth in the appended claims forming a part hereof.

In general terms, the improved tiering pallet construction, constituting the present invention, may be stated as comprised of a flat tiering pallet having a corrugated sheet metal top with two channel supporting members permanently affixed therebeneath, said channel support members running at opposite edges and the full width of the corrugated top transverse the corrugations, there being a hole formed in each of the four corners of the pallet sheet metal top, an upwardly extending conical dimple formed at either end of each of the two channel members, the apices of said dimples being directly beneath and in vertical alignment with the centers of said holes, four identical separable tubular spacing or tiering legs, the tiering legs being closed in a conical shape at their upper ends and cut at right angles to the length and open at their lower ends.

The tubular spacing legs are inserted open end down in the holes formed in the corners of the top of the pallet, and the open end is received over the top conical portion of the dimples formed in the base of the channel supporting members. The second pallet, to be tiered above the first, is placed so that the closed conical shaped upper ends of the tubular spacing legs enter the under or concave side of the conical dimples formed in the channel supporting members of the second or upper pallet.

By way of example, an embodiment of the improved tiering pallet construction of the present invention is illustrated in the accompanying drawings forming a part hereof, wherein like numerals indicate similar parts throughout the several views, and in which:

Figure 1 is a side elevation of two pallets constructed and tiered in accordance with this invention;

Fig. 2, a fragmentary top elevation of a pallet corner;

Fig. 3, a fragmentary end elevation of a pallet corner with a tiering leg in position;

Fig. 4, an enlarged view in section taken along line 4—4 in Fig. 3; and

Fig. 5, a side elevation of one of the tubular tiering legs.

The improved tiering pallet construction shown in Fig. 1 includes a corrugated sheet metal top generally indicated at 1, channel support members generally indicated at 2 and spacing or tiering legs generally indicated at 4.

The corrugated top 1 is made of sheet metal, usually steel or aluminum, having numerous corrugations, generally indicated at 9, running the complete length of the pallet top. These corrugations are spaced at measured intervals across the width of the pallet top.

At opposite sides of the top, and parallel to the length of the corrugations, the top edge portion 12 (Fig. 4) is bent at right angles downwardly to form vertical edge portion 13. Vertical edge portion 13, after extending downwardly for a measured distance, is bent at right angles inwardly, beneath and in a plane parallel to the plane of the top edge portion 12, to form the horizontal underside edge portion 14. The horizontal underside edge portion 14 extends inwardly to and abuts the lower outside corner 16 of the first corrugation. It is here welded, or otherwise permanently affixed, to the lower outside corner of the first corrugation at measured intervals the entire length of the pallet top, said weld being indicated at 15. Thus are formed double measurably spaced thickness edge portions running parallel the corrugations and at opposite sides of the top of the pallet.

In the pallet top, in each of the four corners and a measured distance from said corners, are circular openings generally indicated at 3 and 3a formed therein. Said circular openings or holes extend through the double thickness edge portion of the top described above, with the hole 3a in the underside edge portion 14 in direct vertical alignment and the same diameter as the hole 3 in the top side edge portion 12. The four sets of circular openings 3 and 3a are a measured amount larger in diameter than the outside diameter of the spacing or tiering legs 4 so that said legs can be received therein with desired clearance.

Beneath the flat sheet metal corrugated top are channel supporting members 2, running at opposite edges of the corrugated top and transverse the corrugations. These channel members 2 are permanently affixed to the underside of the top by welding or some such means. Said welds, generally indicated at 8 are spaced at intervals along the underside of the corrugated top and specifically at the underside of the bottoms of the corrugations 9.

The channel supporting members 2 are mounted on the underside of the corrugated top 1 with their open sides up (Fig. 3). In cross section, said channel members 2 have two vertically extending portions or legs 17 and a flat base portion 18. Said vertical portions 17 are of measured height to hold the corrugated top a sufficient distance from the floor so that the forks of a lift truck may enter thereunder.

In said flat base portion 18, near each end of the two channel supporting members 2 and directly beneath the circular openings 3 and 3a in the double thickness edge portions of the corrugated top, are formed conically shaped upwardly extending dimples, generally indicated at 5 (Fig. 4). As shown, this conical dimple configuration results in each dimple having an arcuate top and sloping sides. The apices of said dimples are in exact vertical alignment with the centers of said circular openings 3 and 3a.

In cross-section the conically shaped dimples are made up of essentially straight side portions 11 (Fig. 4) and the apex is formed by arcuate portion 10. The top of the conical dimple is a measured distance above the plane of the flat base portion 18 of the channel supporting member 2. The base of said conically shaped dimple is of a diameter a measured amount larger than the diameter of the circular openings 3 and 3a and larger than the diameter of the tubular tiering or spacing legs 4.

The four tiering or spacing legs each have a uniform cross section from their bottom ends at least to a zone spaced above the platform when the tiering legs are assembled with the platform. Tiering legs 4 are of measured uniform length, having a conically-shaped top 6 and an open lower end 7 cut at right angles to the length of the leg.

The lower or open ends 7 of the tiering legs 4 are inserted in the circular openings 3 and 3a in the pallet top 1, said legs extending through said top and resting on the conical dimples 5 of the channel supporting members 2 (Fig. 4). The inside edges of the open ends 7 of the tiering legs rest on the straight sides 11 of the conical dimples 5 with the arcuate portions 10 of the conical dimples 5 being received within the tubular openings in the tiering legs 4. The diameter of the tiering legs 4 being only a slight amount smaller than the diameter of the circular openings 3 in the pallet top, the tiering legs are thus held in an essentially directly vertical position.

When a second pallet is tiered above the first, the closed conically-shaped tops of the tiering legs 4 enter the underside of the conically-shaped dimples 5 formed in the channel supporting members 2 on the upper or second pallet. The apices of the closed conically-shaped top ends of the tiering legs center and rest against the underside of the apices of the conically-shaped dimples. Thus a positive positioning is made between the tiering legs and the upper pallet.

The design of the tiering pallet that comprises the present invention is very simple and economical, being made up of simply a corrugated sheet metal top 1 and two channel supporting members 2. This greatly reduces both the initial cost of material and the cost of the labor to manufacture, since few operations are required to produce the finished pallet.

Also additional costs are eliminated for the ultimate user of this type pallet because of their complete interchangeability. Every pallet contains the same channel supporting members 2 to support the load on the pallet as well as to hold it a sufficient distance from the floor or ground so that the forks of a lift truck may enter thereunder. Every pallet contains the same conically shaped dimples 5 in the channel supporting members which conically shaped dimples will selectively engage a tiering leg above and a tiering leg below. Any pallet, therefore, can be used as either a base pallet, above which can be tiered other pallets, or as a pallet that is tiered above a base pallet. This eliminates the necessity of the user purchasing two different types of pallets.

An additional feature of the present invention is the positive means by which the tiering legs 4 are received and centered. When it is desired to place tiering legs in the first or base pallet, such legs need only be inserted in the circular openings 3 and 3a of the pallet top with the centering taking place automatically because of the unique design combination of a straight sided arcuate top conically shaped dimple entering into the open end of a tubular tiering leg. When it is desired to tier a second pallet above the first, it is only necessary to position the second pallet above the first so that the top conically shaped closed end 6 of the tubular tiering leg enters somewhere within the opening formed by the underside of the conically shaped dimple. The weight of the second pallet will then automatically force the apex of the conically shaped tiering leg to meet the underside of the apex on the conically shaped dimple, thereby giving positive centering.

Another feature of the present design is the fact that no additional parts or pieces are required to accomplish the tiering operation other than the four tiering legs. This means savings to the user as well as ease in tiering.

Further, the means in the pallet for receiving the tiering legs is contained within the confines of the pallet top and channel supporting legs so that such means is not only protected from the extreme abuse material handling pallets are required to take in the modern factory, but in addition it does not increase the normal height of the pallet and thereby is a space saving factor. Finally, as clearly shown in the drawings, the conically-shaped dimples 5 form the sole vertical support for the tiering legs 4, that is, these dimples support the entire vertical load of the tiering legs 4 and other pallets supported thereabove so that these tiering legs may be economically formed of a uniform diameter throughout their length except for the conically-shaped tops 6 thereof.

In the foregoing description, certain terms have been used for brevity, clearness and understanding, but no unnecessary limitations are to be implied therefrom, because such words are used for descriptive purposes herein, and are intended to be broadly construed.

Moreover, the embodiment of the improved construction illustrated and described herein is by way of example, and the scope of the present invention is not limited to the exact details of the construction shown.

Having now described the invention, the construction, operation and use of a preferred embodiment thereof, and the advantageous new and useful results obtained thereby; the new and useful construction and reasonable mechanical equivalents thereof obvious to those skilled in the art are set forth in the appended claim.

We claim:

In a tiering pallet, a rectangular, corrugated sheet metal platform portion provided at two opposite edges with downwardly extending support members, the support members being channel-shaped and having a base portion and upstanding leg portions, said channel-shaped support members extending the entire length of said two opposite platform edges and transversely of the corrugations, said platform also being provided at its two opposite ends with downturned and inturned edge portions with the inturned edge portions being spaced from the platform portions, there being aligned holes formed at each platform corner in the platform and inturned edge portion thereof, there being a straight sided arcuate top conically shaped dimple formed in the support member base portion at each pallet corner in alignment with and extending upwardly toward said holes, and said upstanding channel leg portions protecting said dimples from injury when the pallet is handled by lifting means.

References Cited in the file of this patent

UNITED STATES PATENTS

| | | |
|---|---|---|
| 1,490,665 | Gifford | Apr. 15, 1924 |
| 2,598,800 | Kopper | June 3, 1952 |
| 2,634,931 | Weitzel | Apr. 14, 1953 |
| 2,635,786 | Wickson | Apr. 21, 1953 |
| 2,673,700 | Eberhardt | Mar. 30, 1954 |